United States Patent
Peng et al.

(10) Patent No.: US 7,581,086 B2
(45) Date of Patent: Aug. 25, 2009

(54) DIGITAL SIGNAL PROCESSOR

(75) Inventors: Chuan-Cheng Peng, Taipei County (TW); Po-Han Huang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 235 days.

(21) Appl. No.: 11/679,028

(22) Filed: Feb. 26, 2007

(65) Prior Publication Data

US 2008/0172546 A1    Jul. 17, 2008

(30) Foreign Application Priority Data

Jan. 16, 2007    (TW) .............................. 96101577 A

(51) Int. Cl.
*G06F 9/312* (2006.01)

(52) U.S. Cl. ........................................ 712/220; 712/35

(58) Field of Classification Search ................. 712/220
See application file for complete search history.

(56) References Cited

U.S. PATENT DOCUMENTS

| | | | | |
|---|---|---|---|---|
| 6,009,363 A | * | 12/1999 | Beckert et al. | ................. 701/33 |
| 6,081,783 A | * | 6/2000 | Divine et al. | ................. 704/500 |
| 2004/0006681 A1 | * | 1/2004 | Moreno et al. | ................. 712/4 |

OTHER PUBLICATIONS

Lin, Tay-Jyi, etal., A Novel Register Organization for VLIW Digital Signal Processors, 2005, IEEE, pp. 337-340.*

* cited by examiner

*Primary Examiner*—Eric Coleman
(74) *Attorney, Agent, or Firm*—Quintero Law Office

(57) ABSTRACT

A digital signal processor is provided, comprising at least one cluster. The cluster may comprise at least two function units each conducting different instruction types, at least two private register files each associated with one function unit for data storage, a ping-pong register providing exclusively accessible data storage, and a public register file. The public register file comprises at least two read ports, each coupled to a function unit, providing read accessibility for the function units, and one write port to write data to the public register file.

6 Claims, 4 Drawing Sheets

DIGITAL SIGNAL PROCESSOR

BACKGROUND OF THE INVENTION

1. Field of the Invention

The invention relates to a digital signal processor (DSP), and in particular, to a public register file in the DSP core circuits.

2. Description of the Related Art

FIG. 1 shows a conventional parallel architecture core DSP (PACDSP), comprising a plurality of clusters 200. Each cluster 200 is composed of different function units such as load/store unit 212 and arithmetic unit 222 for execution of various instruction types. A program controller 108 performs instruction fetch, dispatch and flow control functions. Instructions fetched from an instruction memory 106 are then dispatched to load/store unit 212 or arithmetic unit 222 in each cluster 200 according to their type, such that the load/store unit 212 and arithmetic unit 222 are triggered to function efficiently. In the cluster 200, every function unit has a dedicated register file. For example, the load/store unit 212 is associated with a address register file 214, and the arithmetic unit 222 a accumulation register file 224. If data exchange is required between the load/store unit 212 and arithmetic unit 222, a ping-pong register 210 is used as a bridge. The ping-pong register 210 comprises a plurality of register cells equally grouped into a ping register 202 and a pong register 204, accessed by the function units in a swapping fashion. Each register cell in the ping-pong register 210 can only be accessed by one function unit per cycle, thus, when the load/store unit 212 accesses the ping register 202, the arithmetic unit 222 is only accessible to the pong register 204, and vice versa.

The described architecture is referred to as a distributed register file architecture, mostly adopted in very long instruction word (VLIW) DSPs. The advantage is reduced power consumption and connection ports. When multiple function units require the same data, however, the architecture can be inefficient when performing data inter-exchange between the distributed function units. The load/store unit 212 and arithmetic unit 222 cannot use the same ping register 202 or pong register 204 at the same time, thus the ping register 202 and pong register 204 are accessed exclusively in turn. While duplicate data may be stored in the ping register 202 and pong register 204 to serve load/store unit 212 and arithmetic unit 222 synchronously, however, capacity occupation is also doubled. In addition to these inefficiencies, some consecutive data are rapidly and recursively updated for some applications, such as finite impulse response (FIR), infinite impulse response (IIR) and fast Fourier transform (FFT) algorithms. Identical instructions with different parameters are redundantly required to process the consecutive data, needlessly increasing the program code. It is therefore necessary to improve this architecture.

BRIEF SUMMARY OF THE INVENTION

An exemplary embodiment of a digital signal processor is provided, comprising at least one cluster. The cluster may comprise at least two function units each conducting different type instructions, at least two private register files each associated with one function unit for data storage, a ping-pong register providing exclusively accessible data storage, and a public register file.

The public register file comprises at least two read ports each coupled to a function unit, providing read accessibility for the function units, and one write port to write data into the public register file.

Each cluster further comprises at least two index registers, each can be accessed by all function units in that cluster, storing an index value and an offset value. After per read operation, the index value is updated by addition of the offset value. Each function unit supports a pointer instruction that uses the corresponding index value as a parameter.

The digital signal processor further comprises a data memory, accessible by the clusters via a memory interface unit. An instruction memory stores different instruction types. A program controller reads the instruction memory and dispatches the instructions to corresponding function units according to type.

The function units may comprise a load/store unit loading and storing instructions. The private register files include an address register dedicated for the load/store unit, comprising a plurality of register cells for storage of parameters of the loading and storing instructions. The function units also include an arithmetic unit, performing arithmetic calculations. The private register files comprise an accumulation register dedicated for the arithmetic unit, comprising a plurality of register cells for storage of parameters of the arithmetic calculations.

Detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
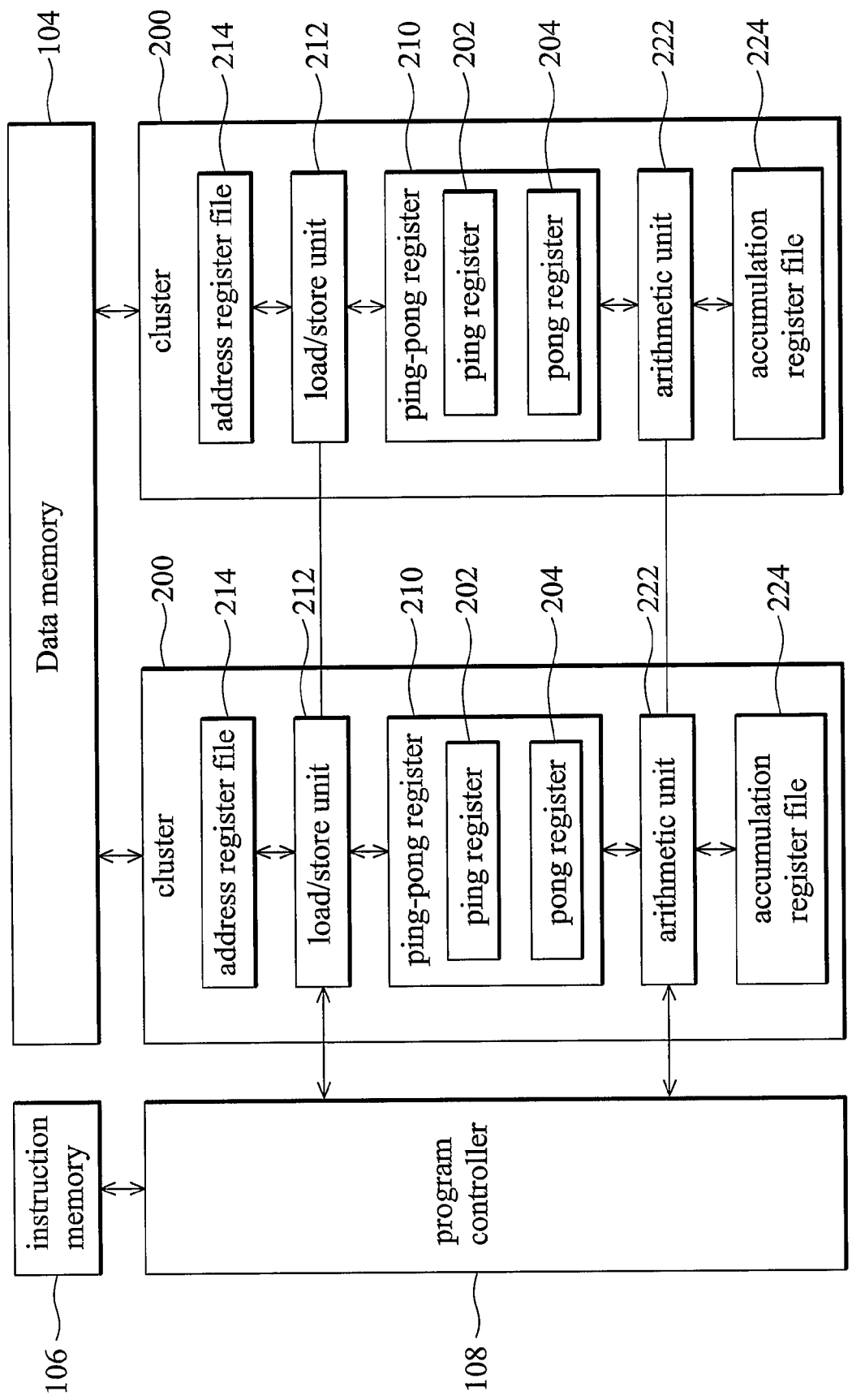
FIG. 1 shows a conventional PACDSP architecture.
Figure 2:
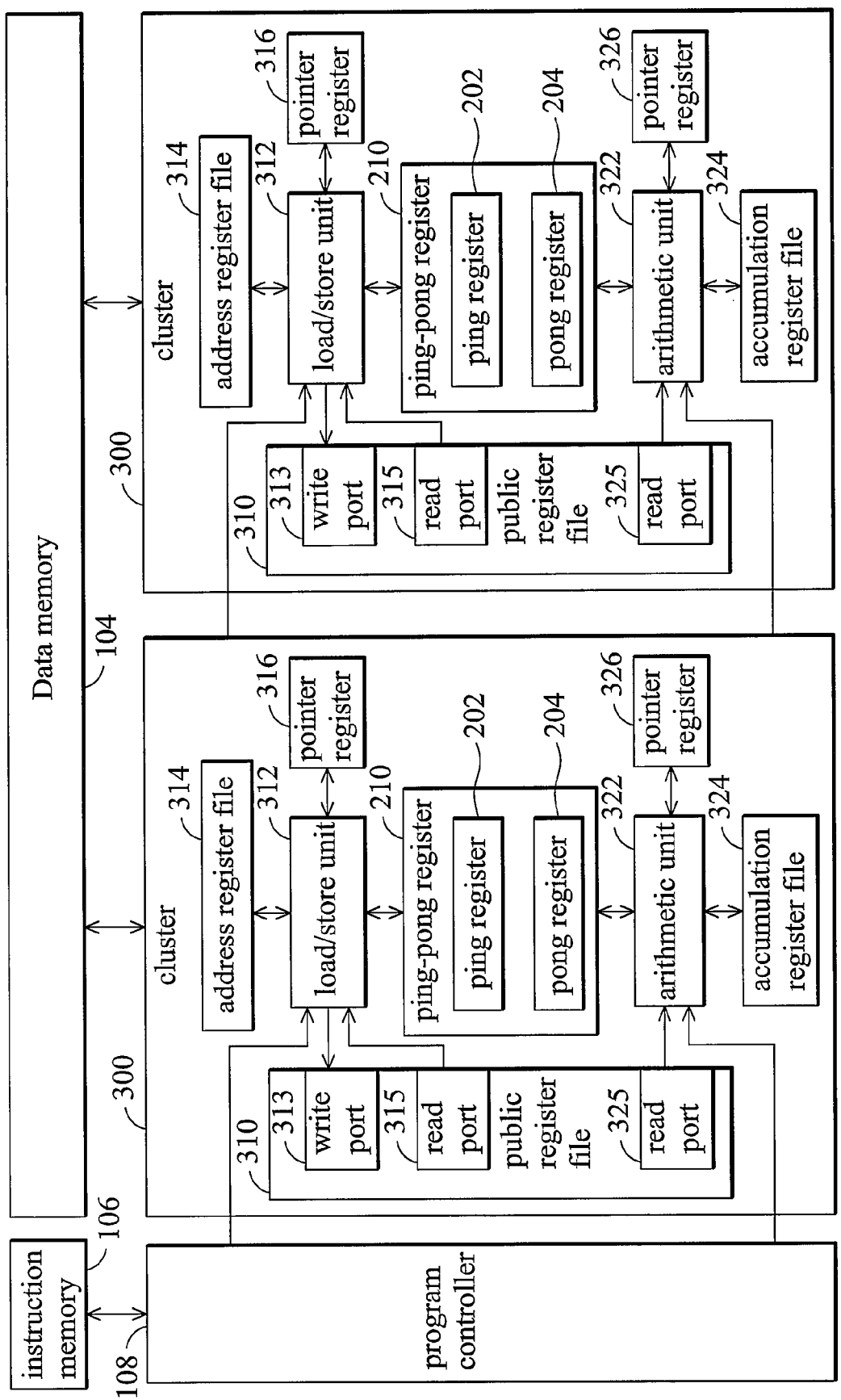
FIG. 2 shows an embodiment of a PACDSP of the invention.

FIG. 2 shows an embodiment of a PACDSP of the invention. In FIG. 2, the cluster 300 is an improved version, accessing the data memory 104 through a memory interface unit (MIU). Various type instructions externally received are stored in instruction memory 106, and the program controller 108 dispatches them to corresponding function units according to type. The load/store unit 312 is capable of executing load instructions and store instructions, and the arithmetic unit 314 is dedicated to arithmetic instructions. The address register file 314 is reserved for load/store unit 312 only, comprising eight or sixteen 32-bit register cells for storage of address values corresponding to the data memory 104. The accumulation register file 324 is dedicated to arithmetic unit 322, comprising a plurality of 40-bit register cells for storage of arithmetic calculation results. In addition to ping-pong register 210, each cluster 300 further comprises a public register file 310 equipped with two read ports 315 and 325, and one write port 313. The read ports 315 and 325 provide simultaneous data accessibility for the load/store unit 312 and arithmetic unit 322, and the write port 313 allows the load/store unit 312 to write data to the public register file 310. In this architecture, the public register file 310 is particularly adaptable for storage of fixed values simultaneously used by multiple function units, such as coefficients of FIR, IIR or FFT algorithms. The public register file 310 may comprise a plurality of 32-bit register cells sequentially associated with consecutive index values. Specifically, the public register file 310 is also referred to a coefficient register, initialized with fixed values to provide read only accessibility.

If the public register file 310 comprises 8 register cells, the index value of each register cell is represented by 3 bits. The public register file 310 may support two read ports and one write port, but the invention is not limited to this embodiment. The number of read ports may be adjusted depending on applications or the number of function units.

Figure 3:
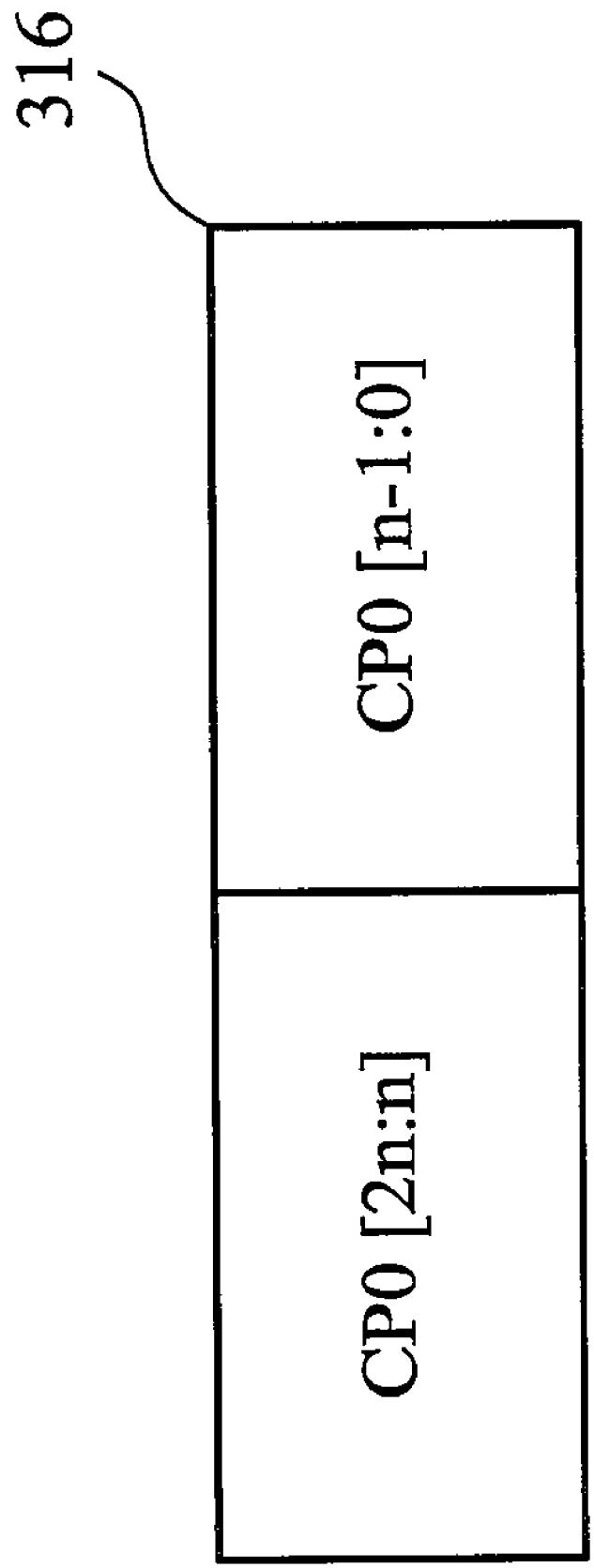
FIG. 3 shows an embodiment of a pointer register.

FIG. 3 shows an embodiment of a pointer register. Two pointer registers 316 and 326 are further implemented in the cluster 300, and each can be accessed by both load/store unit 312 and arithmetic unit 322. Practically, the pointer register is a zero phase (CP0) circuit, divided into two columns, CP0[n−1:0] and CP0[2n:n], respectively storing an index value and an offset value. The index value is automatically updated by the offset value after it is accessed. As shown in FIG. 3, the index value stored in CP0[n−1:0] is n bit, whereas the offset value in CP0[2n:n] is n+1 bit. The extra bit of the n+1 bits indicates polarity of the offset value, such that index value update may comprise addition or subtraction. The function units in the embodiment further support a particular pointer instruction that uses the index value in the pointer register as a parameter. As an example, a conventional instruction sequence is:

LW D0, A0, 4+
LW D1, A0, 4+
LW D2, A0, 4+
. . .
LW D7, A0, 4+

The instruction codes sequentially move data from the registers D0~D7 to register A0. The pointer instruction of the embodiment simplifies the instruction codes to a compact from that renders the same effect:

LOOP:
LW [CP0], A0, 4+

If index values of the registers D0~D7 are 0 to 7, the CP0[n−1:0] is a 3 bit column having an initial index value 000, and the column CP0[n−1:0] is 4 bit with an offset value 0001. When the column[n−1:0] is accessed, its value is updated:

$$CP0[n-1:0]=CP0[n-1:0]+CP0[2n:n]$$

Thus, the index value comes out to be 1 at the second cycle, pointing to register D1, and so forth, the index value at the eighth cycle is 7, pointing to register D7. In this way, one pointer instruction cooperating with pointer register files can be recursively executed to replace the conventional instruction sequence, significantly reducing code capacity occupation.

Figure 4:
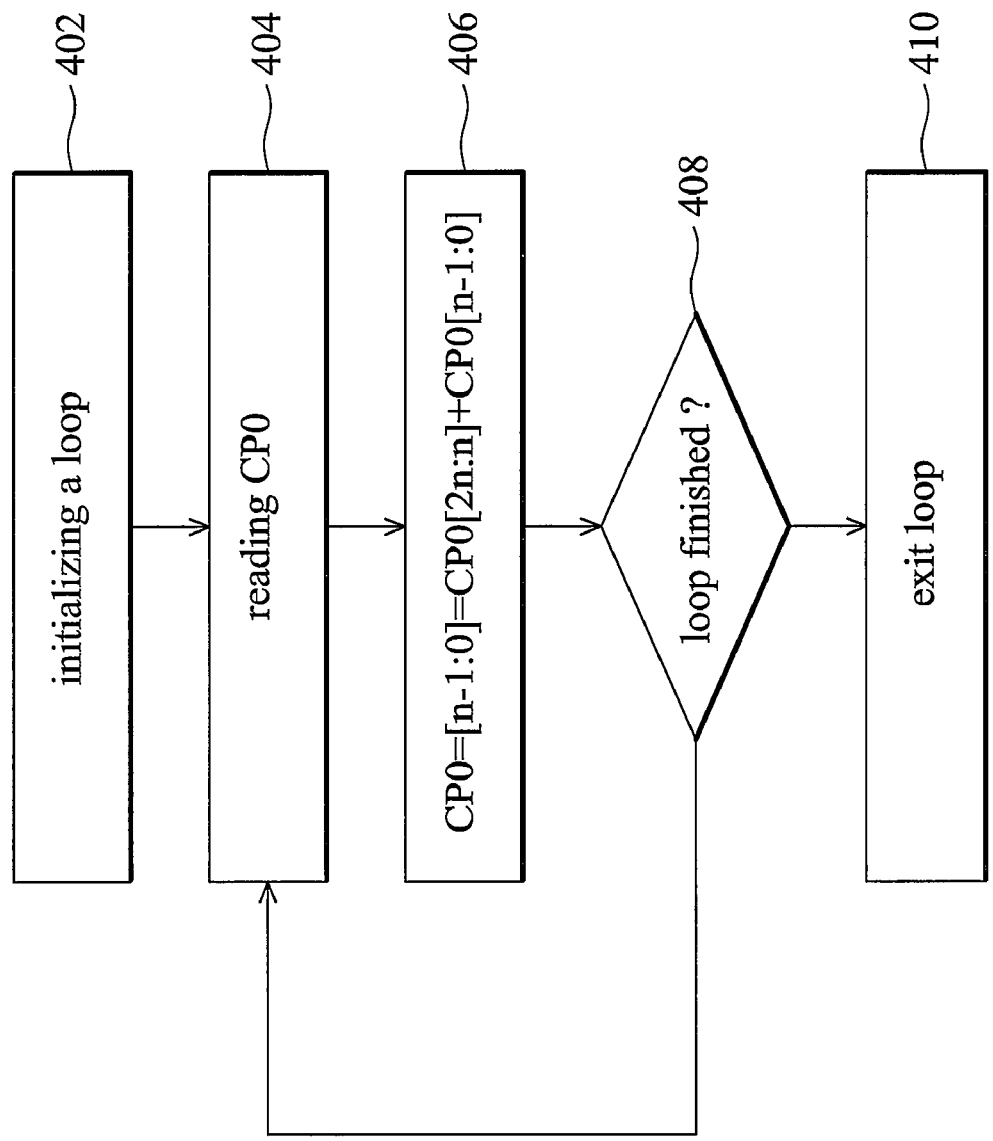
FIG. 4 is a flowchart of the pointer register operation.

FIG. 4 is a flowchart of an operation using the pointer register. In step 402, a loop is initialized to recursively execute the pointer instruction. In step 404, the pointer instruction reads the index value stored in the column CP0[n−1:0] as a parameter. In step 406, the column CP0[n−1:0] updates the index value according to the offset value in the column CP0[2n:n]. In step 408, it is determined whether the loop is finished. If not, the process returns to step 404. Otherwise, step 410 concludes the operation.

In summary, the embodiment of cluster 300 proposes a public register file 310 to enhance the conventional architecture, and the usage of pointer register files 316 and 326 improves efficiency of code capacity.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A digital signal processor, comprising:
   at least one cluster, comprising:
   at least two function units, each conducting different type instructions, comprising a load/store unit for executing loading and storing instructions, and an arithmetic unit for performing arithmetic calculations, wherein the load/store unit and the arithmetic unit support pointer instructions;
   two index register files respectively connected to the load/store unit and the arithmetic unit, each maintaining an index value and an offset value; wherein each index register file updates the index value by adding the offset value to the index value after per read operation;
   at least two private register files, individually connected to the load/store unit and the arithmetic unit for data storage;
   a ping-pong register, connected to the load/store unit and the arithmetic unit for providing exclusively accessible data storage; and
   a public register file, comprising:
      two read ports, individually connected to the load/store unit and the arithmetic unit, allowing the load/store unit and the arithmetic unit to concurrently read same data from the public register file; and
      one write port directly connected to the load/store unit, via which data is input and stored in the public register file.

2. The digital signal processor as claimed in claim 1, further comprising a data memory, accessible by the clusters via a memory interface unit.

3. The digital signal processor as claimed in claim 2, further comprising:
   an instruction memory, storing different type instructions; and
   a program controller, coupled to the instruction memory and the clusters, reading the instruction memory and dispatching the instructions to corresponding function units according to the instruction types.

4. The digital signal processor as claimed in claim 3, wherein:
   one of the private register files connected to the load/store unit is an address register comprising a plurality of register cells for storage of parameters of the loading and storing instructions.

5. The digital signal processor as claimed in claim 3, wherein:
   one of the private register files connected to the arithmetic unit is an accumulation register comprising a plurality of register cells for storage of parameters of the arithmetic calculations.

6. The digital signal processor as claimed in claim 3, wherein:
- the ping-pong register comprise a plurality of register cells divided into a ping register and a pong register, providing accessibility for the function units in a swapping fashion;
- when the load/store unit occupies the ping register, the arithmetic unit is inaccessible to the ping register; and
- when the load/store unit occupies the pong register, the arithmetic unit is accessible to the ping register.

* * * * *